(12) United States Patent
Jannsen et al.

(10) Patent No.: US 12,095,137 B2
(45) Date of Patent: Sep. 17, 2024

(54) FASTENING SYSTEM FOR A MODULAR ANTENNA

(71) Applicant: Volkswagen Aktiengesellschaft, Wolfsburg (DE)

(72) Inventors: Bert Jannsen, Lehre (DE); Christian Bronnert, Burgdorf (DE); Michael Thole, Hildesheim (DE); Stefan Brill, Darmstadt (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 258 days.

(21) Appl. No.: 17/632,480

(22) PCT Filed: Jul. 28, 2020

(86) PCT No.: PCT/EP2020/071173
§ 371 (c)(1),
(2) Date: Feb. 2, 2022

(87) PCT Pub. No.: WO2021/023554
PCT Pub. Date: Feb. 11, 2021

(65) Prior Publication Data
US 2022/0285822 A1    Sep. 8, 2022

(30) Foreign Application Priority Data

Aug. 6, 2019  (DE) .................. 10 2019 211 755.4

(51) Int. Cl.
*H01Q 1/12*  (2006.01)
(52) U.S. Cl.
CPC ............. *H01Q 1/12* (2013.01); *H01Q 1/1214* (2013.01)

(58) Field of Classification Search
CPC ...... H01Q 1/12; H01Q 1/1214; H01Q 1/3275; F16B 5/0233; F16B 37/044; F16B 23/0061
See application file for complete search history.

(56) References Cited

U.S. PATENT DOCUMENTS

| 2,468,391 A | * | 4/1949 | Cejka ................... H01Q 1/1214 |
| | | | 174/75 C |
| 2,479,897 A | * | 8/1949 | Baxter ...................... H01Q 3/08 |
| | | | 343/765 |
| 2,939,335 A | * | 6/1960 | Charles .................. H01Q 3/005 |
| | | | 74/10.8 |

(Continued)

FOREIGN PATENT DOCUMENTS

| CN | 101061605 A | * | 10/2007 | ........... H01Q 1/1214 |
| CN | 108180259 A | * | 6/2018 | ............... F16H 1/32 |

(Continued)

OTHER PUBLICATIONS

PCT/EP2020/071173. International Search Report (Nov. 3, 2020).
DE 102019211755.4. Office Action (Mar. 25, 2020).

*Primary Examiner* — Ricardo I Magallanes
*Assistant Examiner* — Jordan E. DeWitt
(74) *Attorney, Agent, or Firm* — Peter Zura; LOZA & LOZA, LLP

(57) ABSTRACT

A fastening configuration for a roof antenna. A plug connection is located between the roof antenna and a control device in the center of the fastening configuration, and mechanical connection components are located around the plug connection.

18 Claims, 7 Drawing Sheets

(56) References Cited

U.S. PATENT DOCUMENTS

| | | | | |
|---|---|---|---|---|
| 3,492,769 | A | * | 2/1970 | Olson .................... F16B 9/056 248/539 |
| 6,009,767 | A | * | 1/2000 | Rudolph ................ F16H 37/12 475/11 |
| 6,196,781 | B1 | * | 3/2001 | Yang ...................... F16B 33/00 411/397 |
| 6,421,030 | B1 | * | 7/2002 | Oglesby .................. H01Q 9/16 343/702 |
| 6,682,284 | B2 | * | 1/2004 | Chen .................... B24B 45/006 411/917 |
| 6,930,643 | B2 | * | 8/2005 | Byrne .................. H01Q 1/3275 343/702 |
| 7,710,333 | B2 | * | 5/2010 | Byrne .................. H01Q 1/1214 343/906 |
| 7,768,465 | B2 | * | 8/2010 | Jared .................. H01Q 1/3275 343/872 |
| 8,059,044 | B2 | * | 11/2011 | Rode .................. H01Q 1/1214 343/878 |
| 8,094,085 | B2 | * | 1/2012 | Sato ........................ H01Q 1/42 343/711 |
| 8,441,401 | B2 | * | 5/2013 | Steinkamp ........... H01Q 1/1214 343/715 |
| 8,622,356 | B2 | * | 1/2014 | Lerchner ............... H01Q 1/3275 248/231.21 |
| 2007/0279302 | A1 | | 12/2007 | Byrne et al. |
| 2008/0045375 | A1 | * | 2/2008 | Vranish ............. F16H 57/02004 74/439 |
| 2014/0299734 | A1 | * | 10/2014 | Nielsen .................... H01Q 1/12 248/560 |
| 2016/0375563 | A1 | * | 12/2016 | Junkers ................... B25F 5/026 81/467 |
| 2018/0116741 | A1 | * | 5/2018 | Garcia Kilroy .. A61B 17/00234 |
| 2019/0003512 | A1 | * | 1/2019 | Junkers ............... B25B 23/1415 |
| 2024/0075612 | A1 | * | 3/2024 | Pinnock ............... A61H 1/0274 |

FOREIGN PATENT DOCUMENTS

| | | | | |
|---|---|---|---|---|
| CN | 108350864 | A | * 7/2018 | .......... F16H 1/2863 |
| CN | 114430874 | A | * 5/2022 | ........... F16B 37/044 |
| CN | 115000677 | A | * 9/2022 | |
| DE | 29500961 | U1 | 6/1995 | |
| DE | 102005044618 | A1 | 11/2006 | |
| DE | 102012207438 | A1 | 11/2012 | |
| EP | 3240104 | A1 | * 11/2017 | .......... H01Q 1/1214 |
| GB | 735582 | A | 8/1955 | |
| WO | 2006136221 | A1 | 12/2006 | |
| WO | 2018062681 | A1 | 4/2018 | |

\* cited by examiner

FASTENING SYSTEM FOR A MODULAR ANTENNA

RELATED APPLICATIONS

The present application claims priority to International Patent App. No. PCT/EP2020/071173 to Jannsen, et al., titled "Fastening System for a Modular Antenna", filed Jul. 28, 2020, which claims priority to German Patent App. No. 10 2019 211 755.4, filed on Aug. 6, 2019, the contents of each being incorporated by reference in their entirety herein.

TECHNICAL FIELD

The invention relates to a fastening system for a modular antenna a method for installing a fastening system for a modular antenna, and to a vehicle as described in detail below.

BACKGROUND

Various antenna devices are known from the prior art. WO 2010/109459 A1, for example, shows a rotating antenna.

WO 2006/136221 A1 discloses a roof antenna comprising a worm gear, by way of which the antenna can be fastened.

DE 200 18 834 U1 describes a combination of a roof antenna for a vehicle with an indicator lamp.

Furthermore, a star handle for latchingly engaging a roof antenna is apparent from DE 10 2012 207 438 A1.

DE 10 2005 044 618 A1 shows a clamping part by way of which a roof antenna of a vehicle can be fastened.

Finally, an antenna that is adjustable by way of an electric motor is known from DE 600 20 769 T2.

It is generally known in the field of roof antennas for vehicles that a radio unit is positioned on the outside of a supporting structure, while a control unit to protect against outside influences is to be arranged on the inside of or behind the supporting structure. For this purpose, the supporting structure must be installed from two sides. This brings with it increasing handling complexity since it must be possible to couple mechanical and electrical components of the radio and control units through the supporting structure.

SUMMARY

In various examples and embodiments disclosed herein, technologies and techniques are described that allows an antenna to be fastened to a supporting structure from multiple sides, wherein the installation complexity is to be as low as possible.

Aspects of the present disclosure are described by the subject matter of the independent claims. Further preferred embodiments will be apparent from the remaining features described in the dependent claims.

In some examples, a fastening system is disclosed for a modular antenna, comprising a supporting structure including a through-opening; and the modular antenna, comprising: an upper module, which comprises a radio unit including a control connector; a lower module, which comprises a control unit including a complementary control connector, wherein the upper module can be caused to bear against the supporting structure above the through-opening, and the lower module can be made to bear against the supporting structure below the through-opening, it being possible to bring the control connector and the complementary control connector into engagement through the through-opening.

In some examples, the upper module furthermore includes an external thread that is arranged concentrically with the control connector, and the lower module comprises a nut that is arranged concentrically with the complementary control connector and includes outer teeth, and that a planet pinion is mounted in the lower module, which is engaged with the outer teeth of the nut and which is able to brace the upper module and the lower module against the supporting structure by way of the nut and the external thread.

In some examples, a method is disclosed for installing a fastening system for a modular antenna, comprising:
a) providing a supporting structure including a through-opening as well as a modular antenna, which comprises:
an upper module, which comprises a radio unit including a control connector;
a lower module, which comprises a control unit including a complementary control connector,
b) placing the upper module above the through-opening, wherein the upper module is made to bear against the supporting structure, and placing the lower module below the through-opening, wherein the control connector and the complementary control connector are brought into engagement through the through-opening.

In some examples, the method may further include the following steps:
c) driving a planet pinion, which is mounted in the lower module and engaged with outer teeth of a nut, wherein the nut is arranged concentrically with the complementary control connector in the lower module, so that the nut is screwed onto an external thread, which is arranged concentrically with the control connector in the upper module, whereby the upper module and the lower module are braced against the supporting structure.

In some examples a modular antenna is disclosed, comprising an upper module, which comprises a radio unit including a control connector; a lower module, which comprises a control unit including a complementary control connector, wherein the upper module and the lower module can be made to bear against one another, it being possible bring the control connector and the complementary control connector into engagement.

In some examples the upper module may furthermore include an external thread that is arranged concentrically with the control connector, and the lower module comprises a nut that is arranged concentrically with the complementary control connector and includes outer teeth, and that a planet pinion is mounted in the lower module, which is engaged with the outer teeth of the nut and which is able to brace the upper module and the lower module against one another by way of the nut and the external thread.

In some examples, the modular antenna may be configured for a fastening system according to the present disclosure and/or is designed for use in a method according to the present disclosure.

The supporting structure disclosed herein may be arranged between the upper module and the lower module where the upper module and the lower module are made to bear against one another and can be braced against one another.

In some examples, a vehicle is disclosed, comprising a fastening system according to the present disclosure and/or a modular antenna according to the present disclosure.

Summarized in other words again, the invention relates to a fastening concept for a roof antenna. It is provided that a plug connection between the roof antenna and a control device is arranged in the center of the fastening concept, and mechanical connecting components are arranged around the same.

The various embodiments of the invention described in the present application can advantageously be combined with one another, unless indicated otherwise in the specific instance.

BRIEF DESCRIPTION OF THE DRAWINGS

Aspects of the present disclosure will be described hereafter in exemplary embodiments based on the associated drawings. In the drawings.

DETAILED DESCRIPTION

Figure 1:
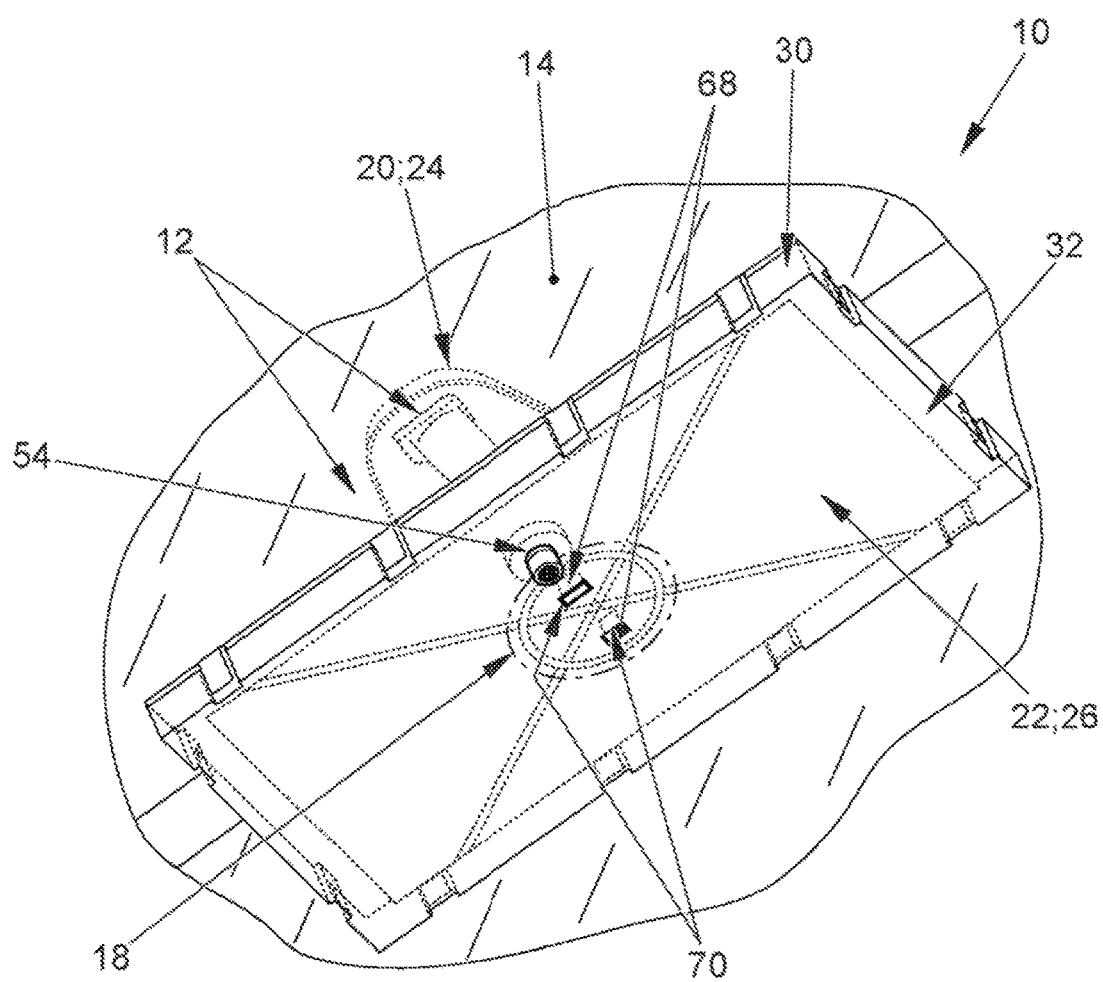
FIG. 1 shows a fastening system according to the invention for a modular antenna according to some aspects of the present disclosure.

In some examples, the fastening system described herein enables particularly easy installation since the combination of the nut and the external thread used for bracing is in each case arranged concentrically with the control connectors. Since, on the one hand, the nut has to be positioned relative to the external thread and, on the other hand, the control connector has to be positioned relative to the complementary control connector, the spatially compact arrangement of these components significantly simplifies the installation process, and facilitates the compensation for tolerances. This holds true even more so when the plug connector comprises a plurality of plug contacts, and the complementary plug connector comprises a plurality of complementary plug contacts, which must be contacted with one another, for example inserted into one another. The concentric arrangement of the nut and the control connectors is made possible since the planet pinion is arranged at an outer circumference of the nut, or next to the nut, and is engaged therewith, and does not occupy any installation space in the center of the arrangement. The planet pinion is thus also particularly easily accessible so as to be actuated.

The term "concentric" as used herein also encompasses the case that the external thread extends, at least in sections, around the control connector. With respect to the nut, the term accordingly encompasses that the nut extends, at least in sections, around the complementary control connector. The external thread can be provided at an outer surface of the control connector or on a different part of the upper module.

The supporting structure disclosed herein may encompass a sheet metal including a hole, for example. The supporting structure preferably encompasses a vehicle roof.

The modular antenna disclosed herein preferably encompasses a roof antenna.

In some examples, the control connector and the complementary control connector are preferably matched to one another in such a way that the antenna and the control unit can be coupled in terms of data and/or energy. Structurally, the term "connector" as used herein should be understood in a broad sense. The key is that a preferably detachable contacting can be established by carrying out a feeding movement.

In some examples the upper module of the fastening element may include a clip connector, and the lower module may include a complementary clip connector, by way of which the lower module and the upper module can be preassembled to one another, wherein the nut can be made to bear against a shoulder of the external thread.

The clip connectors and complementary clip connectors are preferably matched to one another in such a way that the lower module can be clipped from beneath to the upper module and that, in the process, it is oriented parallel or horizontally to the upper module. For this purpose, the clipped-on clip connectors can preferably absorb tilting moments. Moreover, the clipped-on clip connectors can preferably absorb torque when the nut is being tightened. Accordingly, at least two clip connectors and complementary clip connectors are preferably provided in each case. The clip connectors are preferably arranged concentrically to the control connector at the upper module, and the complementary clip connectors are arranged concentrically to the complementary control connector at the lower module.

In this connection, sometimes referred to herein as "concentric", encompasses that the clip connectors and complementary clip connectors are arranged spaced radially apart from the control connector or complementary control connector and, for example, are distributed around these on a circumference.

Such configurations make it easier to screw the nut onto the external thread by way of the planet pinion. On the one hand, the nut thus locates the shoulder on the external thread more easily since the clip connection facilitates the positioning of the lower module. On the other hand, the lower module is securely suspended below the upper module by way of the clip connection, and does not need to be secured separately while the nut is being braced.

In some examples, the lower module may include a housing. The housing can preferably include an upper part and a lower part. In this way, the remaining components of the lower module can be easily preassembled.

The planet pinion disclosed herein preferably includes a tool lip, which is accessible at the housing from the outside, and preferably from beneath. After the lower module has been clipped to the upper module for preassembly purposes, the main installation can be easily carried out from the outside by way of the tool lip by tightening the nut.

In some examples, the fastening system may be configured such that the nut is displaceable along a longitudinal direction of the complementary control connector by way of a spring-loaded mounting.

Such a configuration facilitates the pairing of the nut and the shoulder of the external thread since, due to the resilience in the spring-loaded mounting, smaller tolerances in the coaxial orientation of the nut and the external thread are compensated for quickly.

In another example, a tooth engagement length of the planet pinion for the fastening system may be greater than a travel distance of the nut along the longitudinal direction.

In this way, it is ensured that the nut and the planet pinion are always securely engaged, regardless of how the nut is displaced along the longitudinal direction.

In another example the nut for the fastening system, may be configured under a preload of the spring-loaded mounting, bears in sections against an inner wall of the lower module when the nut does not bear against the external thread of the upper module.

The nut is thus advantageously positioned in a defined starting position for preassembly.

In some examples, the nut for the fastening system, may be configured under a further preload of the spring-loaded mounting, and displaced away from the inner wall when the nut comes to bear against a shoulder of the external thread.

This provides haptic feedback during the installation and makes it easier for the nut to locate the shoulder of the external thread. In the case of the above-described preassembly of the lower module at the upper module, a preload is additionally generated by the clip connection, so that the lower module is suspended at the upper module with low oscillation.

In some examples, the lower module can be made to bear against the supporting structure even before the planet pinion is driven by pushing the lower module against the supporting structure. However, the lower module can also first be preassembled, as described below.

In some examples, methods are disclosed to provide a fastening system according to the present disclosure.

In some examples, the methods may include additional steps where, prior to diving the planet pinion, the lower module and the upper module are preassembled to one another by clipping at least one clip connector of the upper module to at least one complementary clip connector of the lower module, wherein the nut comes to bear against a shoulder of the external thread.

In other words, the lower module can be easily inserted from beneath, and may then be retained independently, for further assembly.

In some examples, the nut can be displaced along a longitudinal direction of the complementary control connector by way of a spring-loaded mounting, and that the nut may first bear, under a preload of the spring-loaded mounting, in sections against an inner wall of the lower module, and is then displaced away from the inner wall, under a further preload from the spring-loaded mounting, when the nut comes to bear against a shoulder of the external thread.

In some examples, the nut may come to bear against the shoulder of the external thread before the clip connectors and complementary clip connectors are clipped together.

In this way, a preload is applied to the nut against the external thread before the nut is tightened by way of the planet pinion, which makes it easier to find the correct seat of the nut on the external thread. Once this has been carried out, the clip connectors can be clipped together, so that the nut cannot lose the shoulder thereof on the external thread.

In some examples, the installation may be completed by driving the planet pinion after the preassembly process, whereby the lower module is made to bear against the supporting structure and is braced with the upper module against the same.

Turning to FIG. 1, the drawing shows a fastening system 10 according to the present disclosure for a modular antenna 12 under an isometric view.

In this example, the fastening system 10 may include a supporting structure 14. The supporting structure 14 may include a sheet metal part of a roof of a vehicle 16 shown by way of example in sections (see FIG. 7). The view in FIG. 1 is directed obliquely from beneath, that is, from the interior of the vehicle 16, at the roof.

Figure 6:
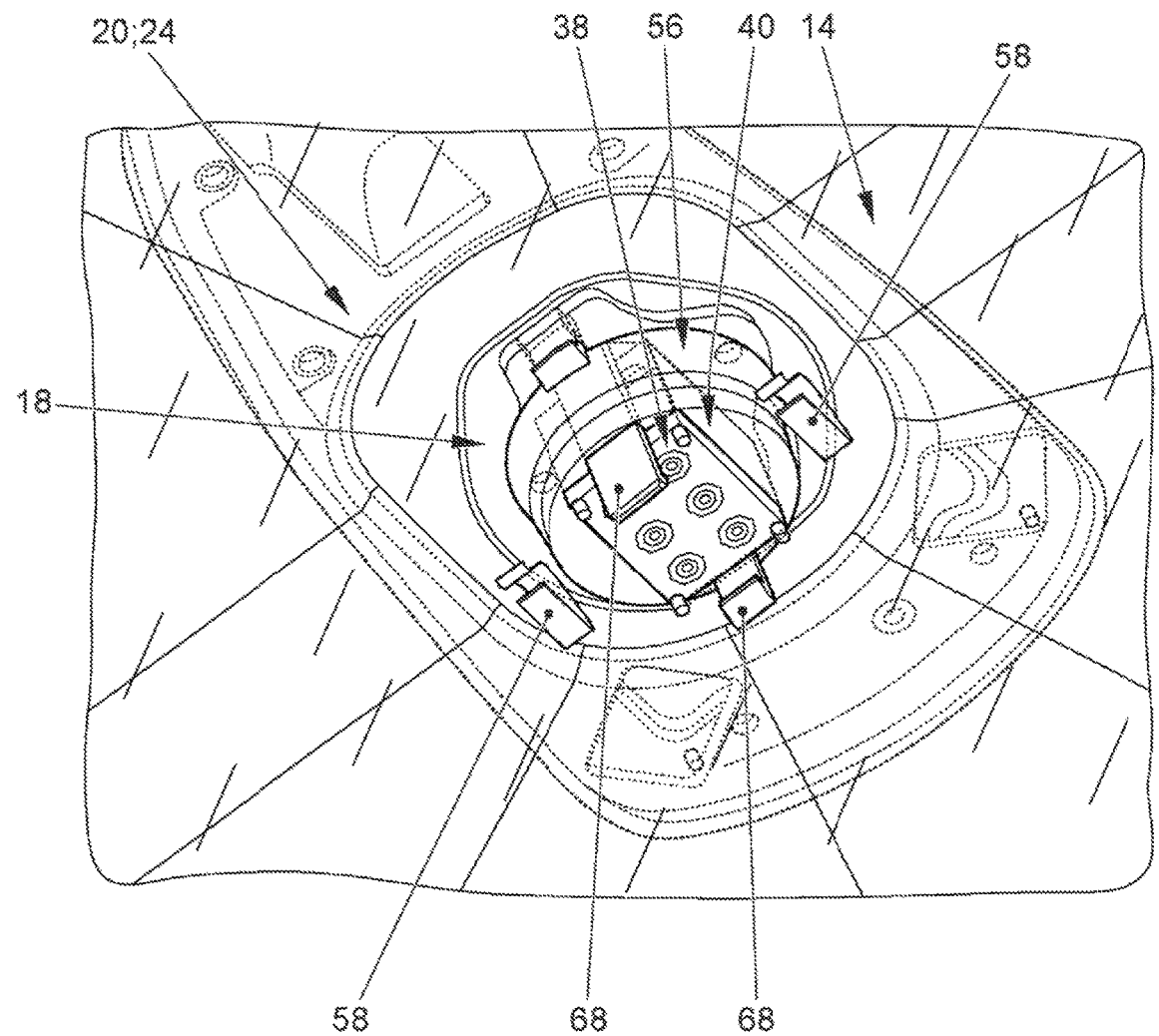
FIG. 6 shows the fastening system, including an open lower module in a further view according to some aspects of the present disclosure.

The supporting structure 14 includes a through-opening 18, which is hidden in this view and thus shown in the figure as a dash-dotted line (see FIG. 6, for example).

The fastening system 10 furthermore comprises the modular antenna 12, including an upper module 20 and a lower module 22. The upper module 20 comprises a radio unit 24. The lower module 22 comprises a control unit 26.

FIG. 1 shows the fastening system 10 in the installed state.

The upper module 20 is made to bear against the supporting structure 14 above the through-opening 18, and the lower module 22 is made to bear against the supporting structure 14 below the through-opening 18. The upper module 20 and the lower module 22 are, as will be described below, braced against the supporting structure 14 and, through the through-opening 18, are in contact energetically and in terms of data transmission by way of a control connector 40 at the upper module 20 and a complementary control connector 38 at the lower module 38 (to be explained in more detail below).

Figure 2:
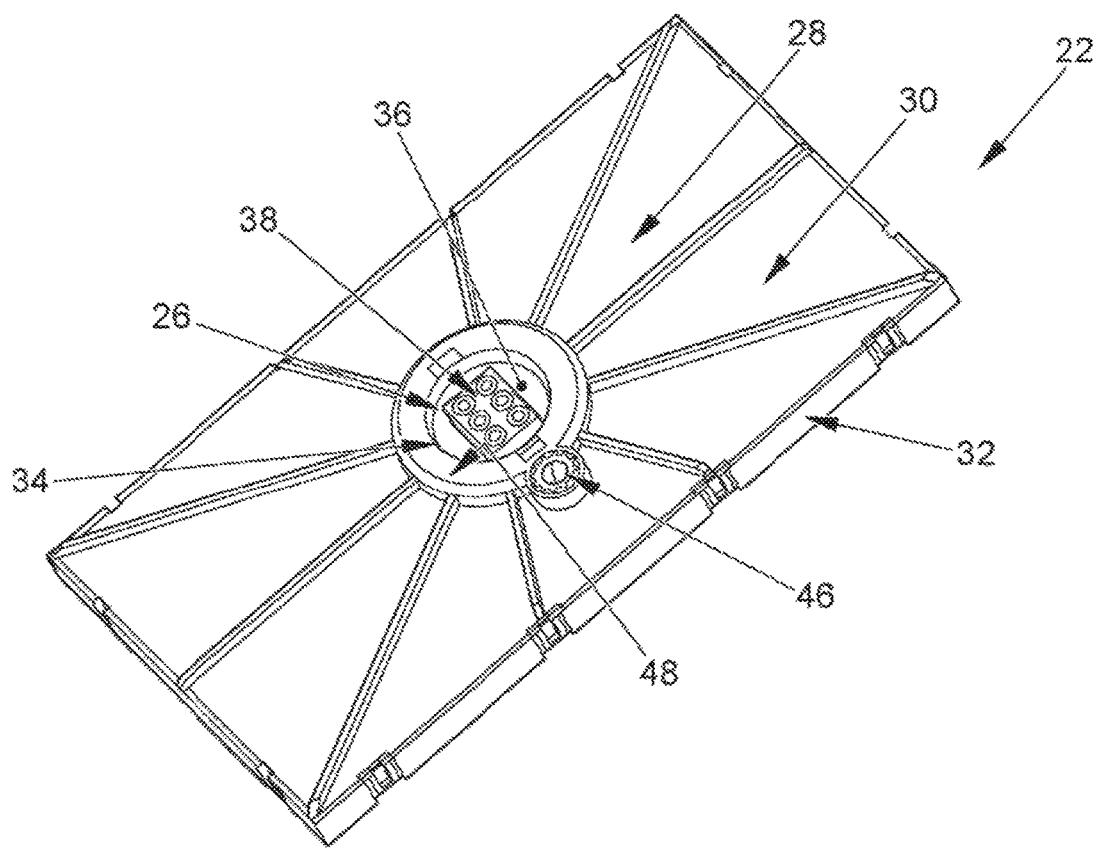
FIG. 2 shows a lower module of the fastening system according to some aspects of the present disclosure.

Reference is made hereafter to FIG. 2, where the lower module 22 of the fastening system 10 from FIG. 1 is described separately in more detail. For this purpose, the lower module 22 is shown isometrically from the side thereof that is hidden in FIG. 1, that is, obliquely from above.

The control unit 26 is more easily apparent in FIG. 2, which is arranged in a housing 28 of the lower module 22. The housing 28 comprises an upper part 30 and a lower part 32.

An opening 34 is provided in the upper part 32. In the installed state, as is shown in FIG. 1, the opening 34 is oriented approximately concentrically with the through-opening 18. In FIG. 1, the lower module 22 rests against the supporting structure 14 in the region of the opening 34.

Referencing FIG. 2 again, the control unit 26 comprises a circuit board 36, onto which the aforementioned complementary control connector 38 is applied. The complementary control connector 38 matches the aforementioned control connector 40 of the radio unit 24 of the upper module 20 and is brought into engagement therewith in the installed state (FIG. 1).

The control connector 40 of the radio unit 24 is indicated in FIG. 6 as a hidden component by dash-dotted lines. FIG. 6 shows the lower module 22 from a perspective view, which corresponds to that of FIG. 1, however, for the purpose of illustration, components located further to the inside, hidden components, such as the circuit board 36 and the housing 28, as well as several other further components to be described hereafter are not shown.

Elements of engagement between the control connector 40 and the complementary control connector 38 are illustrated in FIG. 6, where control connector 40 and the complementary control connector 38 are brought into engagement through the through-opening 18, when the fastening system 10 is installed.

Figure 3:
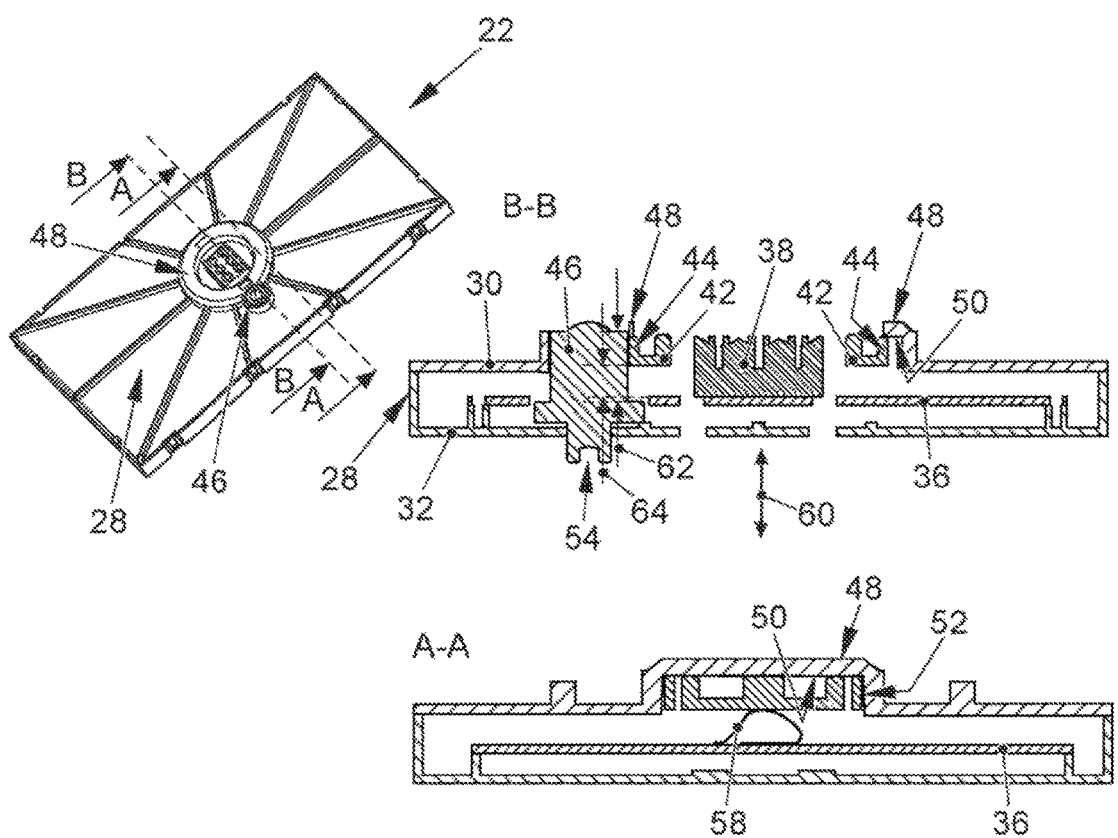
FIG. 3 shows the lower module in sectional views according to some aspects of the present disclosure.

FIG. 3 shows the lower module 22 separately in the uninstalled state in two sectional views A-A and B-B. In sectional view B-B, the inner configuration of the lower module 22 according to intersecting line B is shown, and in sectional view A-A, it is shown according to the intersecting line A.

In sectional view B-B, the complementary control connector 38 is shown in the center in this example, which is seated on the circuit board 36.

A nut 42 is arranged around the complementary control connector 38, or concentrically thereto. The nut 42 is provided with outer teeth 44 and engaged with a planet pinion 46 by way of the outer teeth. The nut 42 and the planet pinion 46 are mounted in the lower module 22. The planet pinion 46 is seated in the upper part 30 as well as the lower part 32 of the housing 28. The planet pinion 46 extends through the lower part 32 with a tool lip 54, by way of which it can be driven from the outside (cf. also FIG. 1).

As becomes easily apparent in conjunction with sectional view A-A and the isometric view in FIG. 3, the nut 42 rests against a collar 48 of the housing 28 on the inner wall 50 thereof, and is guided radially through a lateral surface 52 of the housing 28.

In this arrangement, a rotation of the planet pinion 46 results in a rotation of the nut 42 by way of the outer teeth 44.

Referencing FIG. 6 again now, it is apparent that the upper module 20 is configured with an external thread 56, which is concentrically arranged with the control connector 40. When the upper module 20 and the lower module 22 are installed as shown in FIG. 1, the external thread 56 is also concentrically arranged with the nut 42 (not shown in FIG. 6).

Figure 5:
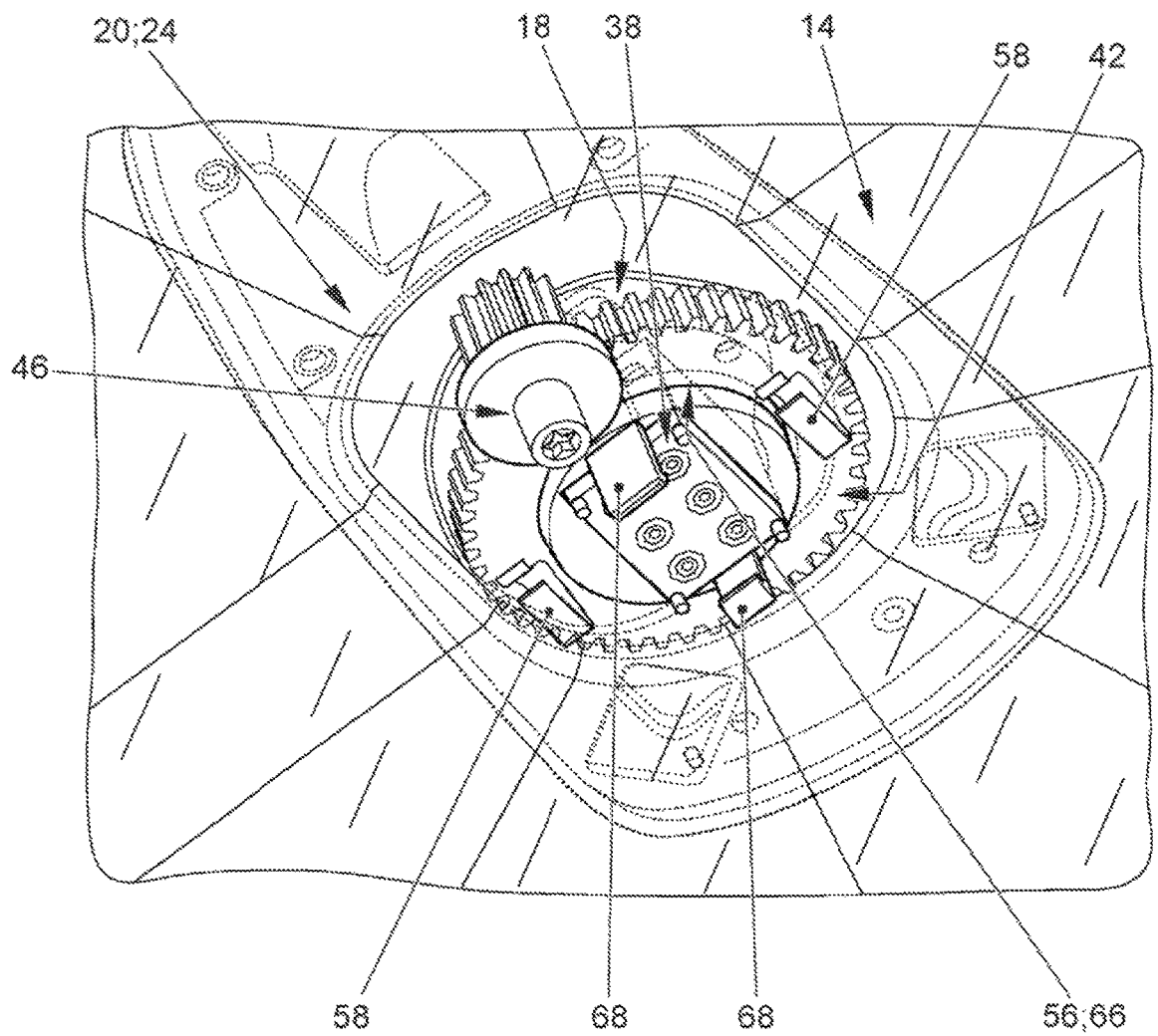
FIG. 5 shows the fastening system, including an open lower module in a further view according to some aspects of the present disclosure.

Reference is made to FIG. 5 with respect to the relative arrangement of the nut 42, where in a view corresponding to FIG. 6 both the nut 42 and the planet pinion 46 are shown.

The nut 42 can brace the upper module 20 and the lower module 22 by way of the external thread 56 against the supporting structure 14 in that the nut is screwed onto the external thread 56, upon actuation of the planet pinion 46, and pushes the housing 28 (not shown in FIGS. 5 and 6) of the lower module 22 against the supporting structure 14 and, in the process, pulls the upper module 20 from above against the supporting structure 14.

It is again apparent from FIG. 3 that the nut 42 can be displaced by way of a spring-loaded mounting 58. The spring-loaded mounting 58 (also shown in FIGS. 5 and 6) here comprises a number of brush springs, which are arranged between the circuit board 36 and the nut 42. The nut 42 is thus displaceable along a longitudinal direction 60 of the complementary control connector 38, under a permanent preload of the spring-loaded mounting 58.

So as to ensure that the planet pinion 46 and the nut 42 are nonetheless in engagement, a tooth engagement length 62 of the planet pinion 46 is selected to be greater than a travel distance 64 of the nut 42 along the longitudinal direction 60.

In the state shown in FIG. 3, in which the upper module 20 and the lower module 22 are not assembled with one another, the nut 42 bears, under a preload from the spring-loaded mounting 58, in sections against the inner wall 50 of the lower module 22 below the collar 48, while the nut 42 is accessible for the external thread 56 of the upper module 20 via the opening 34 in the housing 28. In this non-assembled state, the nut 42 and the external thread 56 of the upper module 20, however, are not yet in contact.

When the lower module 20 is now mounted to the upper module 22 and, for this purpose, the control connector 40 and the complementary control connector 38 are positioned relative to one another and moved toward one another, the nut 42 initially comes to bear against a shoulder 66 of the external thread 56 through the opening 34 and is then screwed onto the external thread 56, upon actuation of the planet pinion 46. This is shown by way of example in FIG. 5. With the aid of the preload of the spring-loaded mounting 58, the nut 42 is thus initially displaced away from the inner wall 50 of the housing 28 (cf. FIG. 3), and comes to bear against the inner wall 50 again when the lower module 20 and the upper module 22 are braced against the supporting structure 14.

Figure 4:
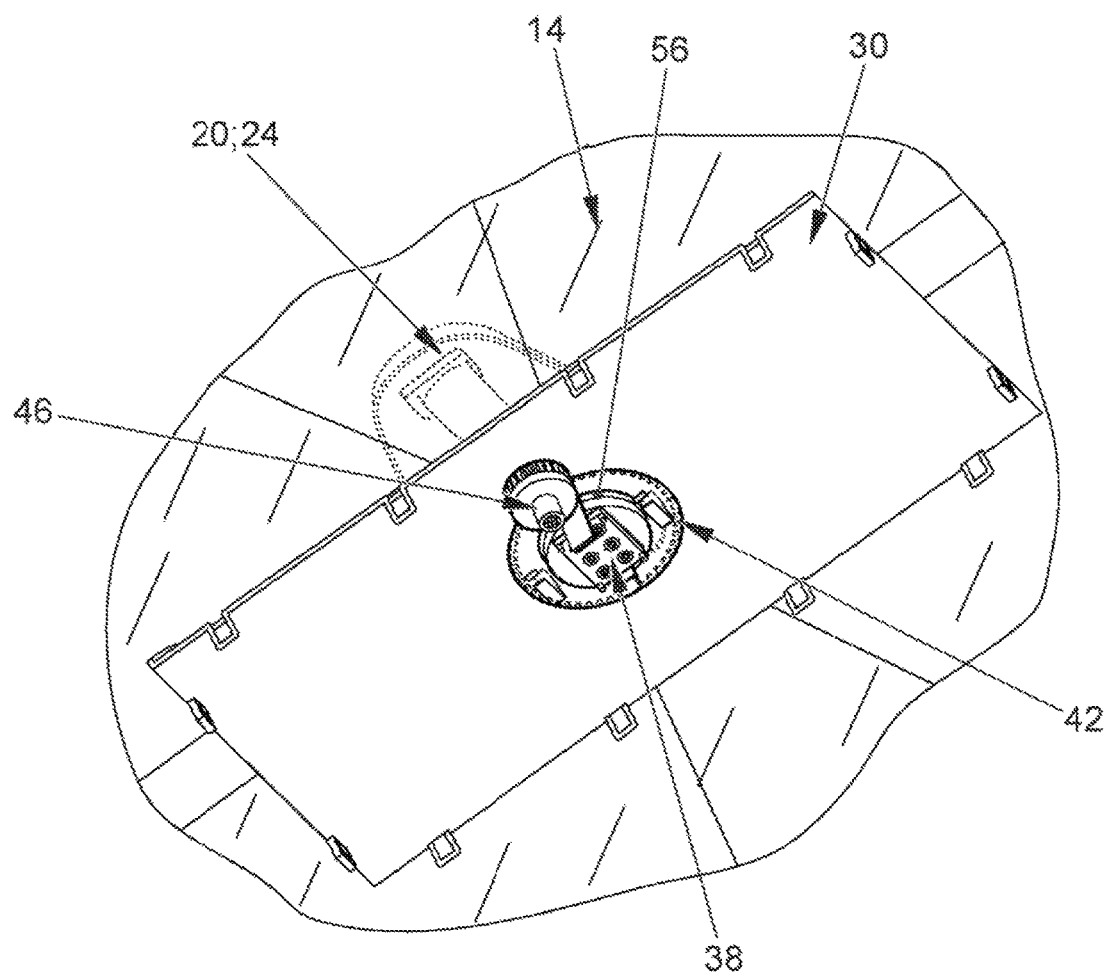
FIG. 4 shows the fastening system, including an open lower module in a first view according to some aspects of the present disclosure.

FIG. 4 illustrates how the nut 42 pushes the upper part 30 of the housing 28 from beneath against the supporting structure 14 and thereby pulls the upper module 20 from above against the supporting structure 14.

So as to facilitate the installation of the fastening system 10, the upper module 20 may include clip connectors 68. The lower module 22 comprises matching complementary clip connectors 70. The clip connectors 68 are easily apparent in FIGS. 5 and 6, for example. FIG. 1 shows how the clip connectors 68, proceeding from the upper module 20, extend through the lower module 22 and are engaged with the complementary clip connectors 70. The clip connectors 68 and complementary clip connectors 70 are used to initially clip the lower module 22 from beneath to the upper module 20 and thereby preassemble it.

Hereafter, the preassembly and also the final assembly will be incrementally explained again based on a method according to the invention for installing the fastening system 10 for the modular antenna 12.

First, in a step c), the supporting structure 14 including the through-opening 18 is provided, and the modular antenna 12 is provided. The modular antenna 12 is still present with a separate lower module 22 and upper module 20.

In a further step b), the upper module 20 is placed above the through-opening 18 on the supporting structure 14, the upper module thereby being made to bear against the supporting structure 14. The control connector 40 extends through the through-opening 18. Moreover, the lower module 22 is placed below the through-opening 18, wherein the control connector 40 and the complementary control connector 38 are brought into engagement.

In a further step b'), the lower module 22 and the upper module 20 are preassembled to one another by clipping the clip connectors 68 of the upper module 20 to the complementary clip connectors 70 of the lower module 22. This can take place while the control connector 40 and the complementary control connector 38 are being brought into engagement, or also after these have already been at least partially brought into engagement.

Meanwhile, the nut 42 is still under a preload from the spring-loaded mounting 58 and bears in sections against the inner wall 50 of the lower module 22.

During preassembly, the nut 42 comes to bear against the shoulder 66 of the external thread 56 at a certain (design-induced) point in time. The point in time depends on the specific kinematics of the fastening system 10 and is between a point in time at which initial contact occurs between the control connector 40 and the complementary control connector 38, and a point in time at which the clip connectors 68 and the complementary clip connectors 70 are tilted.

As a result of the lower module 22 further approaching the upper module 20, the nut 42, which is now pushed against the shoulder 66, is displaced away from the inner wall 50 over the travel distance 64 thereof along the longitudinal direction 60 of the complementary control connector 38, with the aid of the preload of the spring-loaded mounting 58.

After the clip connectors 68 and complementary clip connectors 70 have been clipped together, the lower module 22 is prepositioned with respect to the upper module 20, under a preload resulting from the spring-loaded mounting 58, and is held independently by way of the clip connectors 68, 70. The control connector 40 and the complementary control connector 38 are already sufficiently engaged, so that they no longer slide out of place.

The installation can then be completed by driving the planet pinion 46 in step c), so that the nut 42 is screwed onto the external thread 56 and braces the upper module 20 and the lower module 22 against the supporting structure 14. The driving can be carried out by way of the tool lip 54. Reaction forces and torque are absorbed and compensated for by the clip connectors 68, 70.

Figure 7:
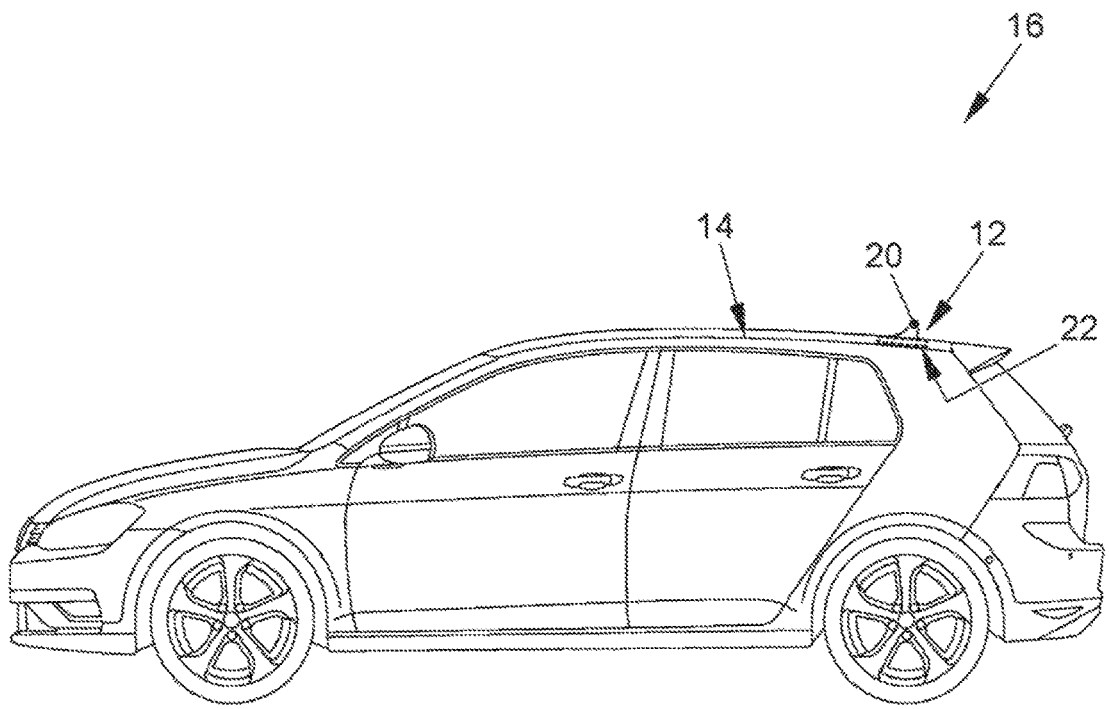
FIG. 7 shows a vehicle according to according to some aspects of the present disclosure.

FIG. 7 shows a vehicle 16 according to the invention. The supporting structure 14 comprises the roof of the vehicle 16.

The modular antenna 12 according to the invention is designed as a roof antenna. The upper module 20 is visible from the outside, while the lower module 22 is indicated as being located on the inside by a dash-dotted line.

LIST OF REFERENCE SIGNS 10 fastening system
12 modular antenna
14 supporting structure
16 vehicle
18 through-opening
20 upper module
22 lower module
24 radio unit
26 control unit
28 housing
30 upper part
32 lower part
34 opening
36 circuit board
38 complementary control connector
40 control connector
42 nut
44 outer teeth
46 planet pinion
48 collar
50 inner wall
52 lateral surface
54 tool lip
56 external thread
58 spring-loaded mounting
60 longitudinal direction
62 tooth engagement length
64 travel distance
66 shoulder
68 clip connector
70 complementary control connector

The invention claimed is:

1. A fastening system for an antenna system, comprising:
a supporting structure comprising a through-opening; and
a modular antenna, comprising (i) an upper module comprising a radio unit and a control connector, and (ii) a lower module comprising a control unit comprising a complementary control connector,
wherein the upper module is configured to bear against the supporting structure above the through-opening, and the lower module is configured to bear against the supporting structure below the through-opening to bring the control connector and the complementary control connector into engagement through the through-opening,
and wherein the upper module further comprises an external thread configured concentrically with the control connector, and the lower module further comprises a nut comprising outer teeth configured concentrically with the complementary control connector; and
a planet pinion housed in the lower module, which engages with the outer teeth of the nut and is configured to brace the upper module and the lower module against the support structure via the nut and the external thread.

2. The fastening system of claim 1, wherein the upper module comprises a clip connector, and the lower module comprises a complementary clip connector, by way of which the lower module and the upper module can be preassembled to one another, and the nut being configured to bear against a projection of the external thread.

3. The fastening system of claim 1, wherein the nut is configured to be displaced along a longitudinal direction of the complementary control connector by way of a spring-loaded mounting.

4. The fastening system of claim 3, wherein a tooth engagement length of the planet pinion housed in the lower module is greater than a travel distance of the nut along the longitudinal direction.

5. The fastening system of claim 3, wherein the nut, under a preload from the spring-loaded mounting, is configured to bear in sections against an inner wall of the lower module when the nut does not bear against the external thread of the upper module.

6. The fastening system of claim 5, wherein the nut, under a further preload of the spring-loaded mounting, is displaced away from the inner wall when the nut comes to bear against a projection of the external thread.

7. A method for installing a fastening system for a modular antenna, comprising:
providing a supporting structure comprising a through-opening;
providing a modular antenna, comprising (i) an upper module comprising a radio unit and a control connector, and (ii) a lower module comprising a control unit comprising a complementary control connector;
placing the upper module above the through-opening, the upper module being configured to bear against the supporting structure;
placing the lower module below the through-opening;
bringing the control connector and the complementary control connector into engagement through the through-opening;
driving a planet pinion, mounted in the lower module and engaged with outer teeth of a nut, the nut being arranged concentrically with the complementary control connector in the lower module, such that the nut is screwed onto an external thread arranged concentrically with the control connector in the upper module, wherein the upper module and the lower module are braced against the supporting structure.

8. The method according to claim 7, further comprising preassembling, prior to driving the planet pinion, the lower module and the upper module to one another by clipping at least one clip connector of the upper module together with at least one complementary clip connector of the lower module, and configuring the nut to bear against a projection of the external thread.

9. The method of claim 7, further comprising configuring the nut to be displaced along a longitudinal direction of the complementary control connector by way of a spring-loaded mounting.

10. The method of claim 9, wherein a tooth engagement length of the planet pinion mounted in the lower module is greater than a travel distance of the nut along the longitudinal direction.

11. The method of claim 9, further comprising configuring the nut, under a preload from the spring-loaded mounting, to bear in sections against an inner wall of the lower module when the nut does not bear against the external thread of the upper module.

12. The method of claim 11, further comprising configuring the nut, under a further preload of the spring-loaded mounting, to be displaced away from the inner wall when the nut comes to bear against a projection of the external thread.

13. A modular antenna, comprising:
an upper module comprising a radio unit including a control connector;
a lower module comprising a control unit including a complementary control connector, wherein the upper module and the lower module are configured to bear against one another, to bring the control connector and the complementary control connector into engagement, and wherein the upper module comprises an external thread that is arranged concentrically with the control connector, and the lower module comprises a nut configured concentrically with the complementary control connector and includes outer teeth; and
a planet pinion, mounted in the lower module, configured to engage with the outer teeth of the nut, and configured to brace the upper module and the lower module against one another via the nut and the external thread.

14. The modular antenna of claim 13, wherein the upper module comprises a clip connector, and the lower module comprises a complementary clip connector, by way of which the lower module and the upper module can be preassembled to one another, and the nut being configured to bear against a projection of the external thread.

15. The modular antenna of claim 13, wherein the nut is configured to be displaced along a longitudinal direction of the complementary control connector by way of a spring-loaded mounting.

16. The modular antenna of claim 15, wherein a tooth engagement length of the planet pinion mounted in the lower module is greater than a travel distance of the nut along the longitudinal direction.

17. The modular antenna of claim 15, wherein the nut, under a preload from the spring-loaded mounting, is configured to bear in sections against an inner wall of the lower module when the nut does not bear against the external thread of the upper module.

18. The modular antenna of claim 17, wherein the nut, under a further preload of the spring-loaded mounting, is displaced away from the inner wall when the nut comes to bear against a projection of the external thread.

* * * * *